US011180375B2

(12) United States Patent
Konnai et al.

(10) Patent No.: US 11,180,375 B2
(45) Date of Patent: Nov. 23, 2021

(54) POROUS HALLOYSITE POWDER AND METHOD FOR PRODUCING HALLOYSITE POWDER

(71) Applicant: JFE MINERAL COMPANY, LTD., Tokyo (JP)

(72) Inventors: Hidefumi Konnai, Tokyo (JP); Takayuki Fujita, Tokyo (JP)

(73) Assignee: JFE MINERAL COMPANY, LTD., Tokyo (JP)

( * ) Notice: Subject to any disclaimer, the term of this patent is extended or adjusted under 35 U.S.C. 154(b) by 0 days.

(21) Appl. No.: 16/344,650

(22) PCT Filed: Oct. 24, 2017

(86) PCT No.: PCT/JP2017/038375
§ 371 (c)(1),
(2) Date: Apr. 24, 2019

(87) PCT Pub. No.: WO2018/079556
PCT Pub. Date: May 3, 2018

(65) Prior Publication Data
US 2020/0062603 A1   Feb. 27, 2020

(30) Foreign Application Priority Data
Oct. 24, 2016   (JP) .............................. JP2016-207919

(51) Int. Cl.
*B32B 5/16* (2006.01)
*C01B 33/00* (2006.01)
(Continued)

(52) U.S. Cl.
CPC .............. *C01B 33/40* (2013.01); *C01B 33/26* (2013.01); *C01P 2002/72* (2013.01);
(Continued)

(58) Field of Classification Search
CPC ...................................................... C01B 33/26
(Continued)

(56) References Cited

U.S. PATENT DOCUMENTS

2007/0202061 A1   8/2007   Riedlinger et al.
2009/0092836 A1   4/2009   Geckeler et al.
2012/0021292 A1   1/2012   Awano et al.

FOREIGN PATENT DOCUMENTS

CN   1728287 A   2/2006
CN   101070163   11/2007
(Continued)

OTHER PUBLICATIONS

Liu et al, Recent advance in research on halloysite nanotubes-polymernanocomposite, Progress in Polymer Science 39 (2014) 1498-1525) (Year: 2014).*

(Continued)

*Primary Examiner* — Hoa (Holly) Le
(74) *Attorney, Agent, or Firm* — Nixon & Vanderhye

(57) ABSTRACT

Provided are a halloysite powder and a method for producing the halloysite powder. The halloysite powder contains granules in which halloysite including halloysite nanotubes is aggregated. The granules have first pores derived from the tube holes in the halloysite nanotubes and second pores that are different from the first pores.

19 Claims, 11 Drawing Sheets

(51) Int. Cl.
*C01B 33/40* (2006.01)
*C01B 33/26* (2006.01)

(52) U.S. Cl.
CPC ...... *C01P 2004/03* (2013.01); *C01P 2004/04* (2013.01); *C01P 2004/13* (2013.01); *C01P 2004/50* (2013.01); *C01P 2004/61* (2013.01); *C01P 2004/62* (2013.01); *C01P 2006/11* (2013.01); *C01P 2006/12* (2013.01); *C01P 2006/14* (2013.01); *C01P 2006/17* (2013.01); *C01P 2006/80* (2013.01)

(58) Field of Classification Search
USPC .................................................. 423/328.1
See application file for complete search history.

(56) References Cited

FOREIGN PATENT DOCUMENTS

| | | |
|---|---|---|
| CN | 101759195 | 6/2010 |
| CN | 102532597 | 7/2012 |
| CN | 102 690 534 | 11/2013 |
| CN | 103772743 A | 5/2014 |
| CN | 106032409 | 10/2016 |
| CN | 106032409 A | 10/2016 |
| EP | 0 325 487 | 7/1989 |
| JP | 02-004452 | 1/1990 |
| JP | 2009-091236 | 4/2009 |
| JP | 2009-513709 | 4/2009 |
| JP | 2012-028026 | 2/2012 |
| JP | 2016-139490 | 8/2016 |

OTHER PUBLICATIONS

Matusik et al, Surface Area and Porosity of Nanotubes Obtained From Kaolin Minerals of Different Structural Order, Clays and Clay Minerals, vol. 59, No. 2, 116-13 5, 2011. (Year: 2011).*
Machine Translation copy of CN101759195A (Year: 2009).*
Pasbakhsh et al, Characterisation of properties of various halloysites relevant to their use as nanotubes and microfibre fillers, Applied Clay Science 74 ( 2013 ) 47-57 (Year: 2013).*
International Search Report, PCT/JP2017/038375, dated Dec. 12, 2017.
Office Action issued in Japanese Patent Application No. 2018-547691 dated Jan. 7, 2020 with English translation and English concise statement of relevance provided.
Japanese Office Action, 2018-547691, dated Aug. 20, 2019.
Cong Chao, et al., Natural Nanotube-Based Biomimetic Porous Microspheres for Significantly Enhanced Biomolecule Immobilization, ACS Sustainable Chemistry & Engineering, Jul. 31, 2013, 2014, 2, p. 396-403.
Office Action issued in Korean Patent Application No. 10-2019-7011749 dated Sep. 2, 2020 with English translation and concise statement of relevance provided.
European Search Report, EP 17 86 5550, dated Sep. 24, 2019.
Randall Hughes et al: "Random clay powders prepared by spray-drying", American Mineralogist, Washington, DC, US, US, vol. 55, No. 10, Sep. 1, 1970 (Sep. 1, 1970), pp. 1780-1786.
Ravindra Kambie et al: Halloysite Nanotubes and Applications: A Review, Journal of Advanced Scientific Research, Jan. 1, 2012 (Jan. 1, 2012), pp. 25-29.

* cited by examiner

POROUS HALLOYSITE POWDER AND METHOD FOR PRODUCING HALLOYSITE POWDER

TECHNICAL FIELD

The present invention relates to halloysite powder and a method of producing halloysite powder.

BACKGROUND ART

Tube-shaped halloysite (halloysite nanotube) has been used for various applications in the related art (for example, see Patent Literature 1).

CITATION LIST

Patent Literature

Patent Literature 1: JP 2009-91236 A

SUMMARY OF INVENTION

Technical Problems

An object of the present invention is to provide halloysite powder having a novel granular structure that has not been achieved in the related art and a method of producing such halloysite powder.

Solution to Problems

The present inventors found that granules obtained by spray-drying a slurry including a halloysite nanotube have a pore (second pore) that is different from a tube hole (first pore), and completed the present invention.

Specifically, the present invention provides (1) to (15) below.

(1) A halloysite powder comprising a granule that is an aggregate of halloysite including a halloysite nanotube, wherein the granule includes a first pore derived from a tube hole of the halloysite nanotube, and a second pore different from the first pore.

(2) The halloysite powder according to (1) above, wherein a differential pore distribution determined from a nitrogen adsorption isotherm by the BJH method exhibits two or more pore size peaks in a range from 10 to 50 nm.

(3) The halloysite powder according to (1) or (2) above, wherein an initial bulk density is not less than 0.40 g/cm$^3$.

(4) The halloysite powder according to any one of (1) to (3) above, wherein a tap bulk density is not less than 0.70 g/cm$^3$.

(5) The halloysite powder according to any one of (1) to (4) above, wherein an angle of repose is not greater than 50°.

(6) The halloysite powder according to any one of (1) to (5) above, wherein an average particle size of the granule is from 0.5 to 200 μm.

(7) The halloysite powder according to any one of (1) to (6) above, wherein a BET specific surface area is from 30 to 200 m$^2$/g.

(8) The halloysite powder according to any one of (1) to (7) above, wherein an average pore size is not less than 11.0 nm.

(9) The halloysite powder according to any one of (1) to (8) above, wherein a total pore area is not less than 59.0 m$^2$/g.

(10) The halloysite powder according to any one of (1) to (9) above, wherein a total pore volume is not less than 0.20 cm$^3$/g.

(11) The halloysite powder according to any one of (1) to (10) above, wherein a quartz content is not greater than 1.00 mass %.

(12) A method of producing the halloysite powder described in any one of (1) to (11) above, the method comprising:
a step of preparing a slurry of halloysite including a halloysite nanotube; and
a step of preparing powder from the slurry.

(13) The method of producing a halloysite powder according to (12) above, further comprising a step of firing the prepared powder.

(14) The method of producing a halloysite powder according to (12) or (13) above, wherein the step of preparing powder from the slurry is a step of spray-drying the slurry.

(15) The method of producing a halloysite powder according to (12) or (13) above, wherein the step of preparing powder from the slurry is a step of media-fluidized-drying the slurry.

Advantageous Effects of Invention

According to the present invention, a halloysite powder having a novel granular structure that has not been achieved in the related art and a method of producing such a halloysite powder can be provided.

DESCRIPTION OF EMBODIMENTS

Figure 1:
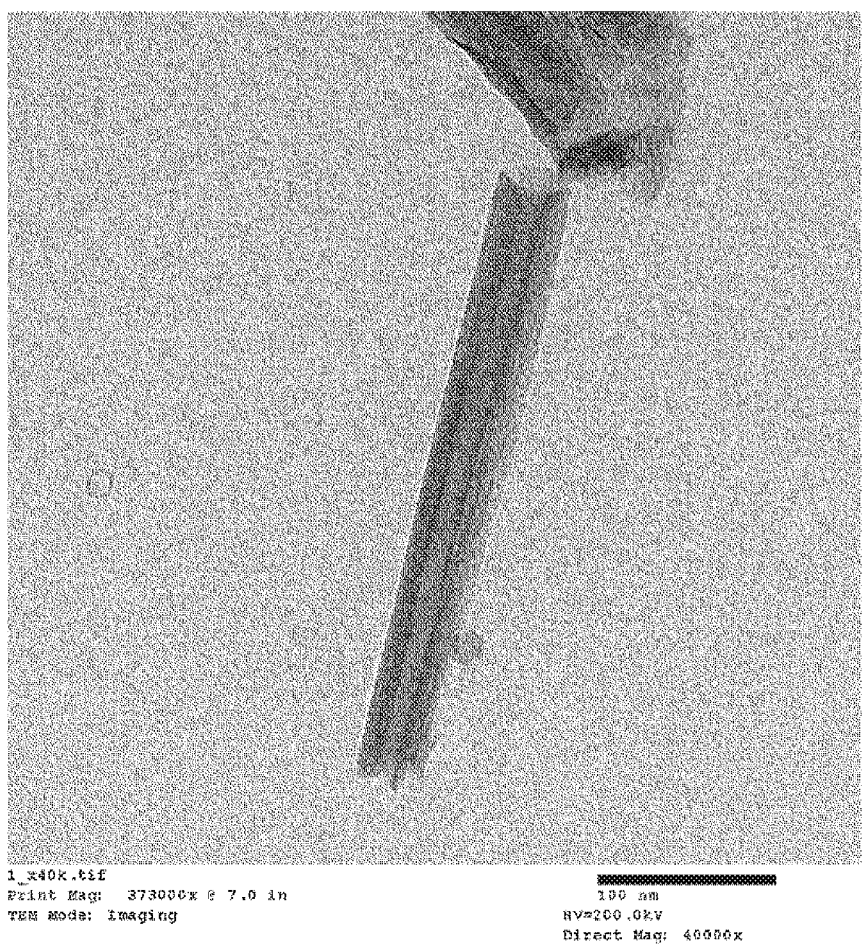
FIG. 1 is a TEM image of a dispersed phase recovered after centrifugation.

The halloysite powder and the method of producing the halloysite powder according to the present invention will be described below.

The numerical ranges indicated using "(from) . . . to . . . " include the former number as the lower limit value and the latter number as the upper limit value.

[Summary of Halloysite]

Halloysite is a clay mineral represented by $Al_2Si_2O_5(OH)_4 \cdot 2H_2O$, or $Al_2Si_2O_5(OH)_4$.

Halloysite assumes various shapes such as a tubular shape (hollow tubular shape), a spherical shape, an angular lump shape, a plate-like shape, and a sheet-like shape.

The inner diameter of a halloysite nanotube (the diameter of a tube hole), which is a tube-shaped (hollow tube-shaped) halloysite, is approximately from 10 to 20 nm, for example. The outer surface of the halloysite nanotube is mainly composed of silicate ($SiO_2$), and the inner surface of the halloysite nanotube is mainly composed of alumina ($Al_2O_3$).

[Method of Producing Halloysite Powder]

Prior to the description of the halloysite powder of the present invention, the method of producing the halloysite powder of the present invention (hereinafter, referred to as "the method of producing the halloysite powder of the present invention," or simply referred to as "the production method of the present invention") will be described first.

The production method of the present invention is a method of producing the halloysite powder of the present invention described later. The production method includes at least a step of preparing a slurry of halloysite including a halloysite nanotube (slurry preparation step), and a step of preparing powder from the slurry (powder preparation step).

A preferred embodiment of the production method of the present invention will be described below.

<Slurry Preparation Step>

The slurry preparation step is not particularly limited as long as a slurry, in which halloysite including a halloysite nanotube is dispersed in a dispersion medium such as water, can be prepared. A preferred embodiment of the slurry preparation step will be described below. In the embodiment described below, a dispersed phase recovered after centrifugation corresponds to a slurry prepared in the slurry preparation step.

<<Raw Material (Iide Clay)>>

The Osodani factory (Osodani, Iidemachi, Nishiokitama-gun Yamagata) of the Iide mining works of JFE MINERAL Co., LTD. produces silica sand from deposits including silica sand and clay. Clay components (hereinafter, referred to as "Iide clay" for convenience) produced as a by-product in the process of purifying the silica sand can be used as a raw material. Iide clay has plasticity and a water content of approximately 40 mass %. Iide clay is mainly composed of halloysite and fine sand (quartz) represented by $SiO_2$. Iide clay may further include a small amount of a cationic polymer flocculant.

Iide clay including water (including approximately 40 mass % of water) may be used as it is, or can be dried under the sun light in a natural manner for use (including semi-dried clay). Water-containing or semi-dried Iide clay may be dried by using equipment.

Dried Iide clay may be pulverized, and further subjected to dry purification, classification, magnetic separation, color sorting, or the like as necessary, and used.

<<Preparation of First Slurry>>

Next, a slurry (first slurry) in which Iide clay is dispersed in water is prepared. The method of dispersing Iide clay in water is not particularly limited, and, for example, known apparatuses such as a high-speed mixer, a disperser, a bead mill, and a homomixer can be used.

The solid content concentration of the first slurry is not particularly limited, and for example, is from 5 to 20 mass %.

<<Removing Coarse Particles>>

Next, coarse particles are removed by, for example, sieving the first slurry. The aperture size of the sieve that is used is, for example, from 25 to 100 μm. As a sieve, for example, a sieve for Japanese Industrial Standards (JIS) test may be used. A common large-size wet sieving apparatus may be used in mass production. Other than the use of a sieve, coarse particles may be removed by performing sedimentation separation or using a wet type cyclone.

<<Filtering>>

Next, the first slurry from which the coarse particles have been removed, is filtered with suction using a filter, and the resulting dehydrated cake is recovered. In a mass production, a dehydrator such as a filter press or an Oliver filter may be used, for example.

This filtering may be omitted, and the slurry from which coarse particles have been removed may be directly used as a second slurry described later. In this case, a dispersant may be added as necessary.

<<Preparation of Second Slurry>>

Water is added to the dehydrated cake, and the mixture was stirred at a high speed to produce a slurry (second slurry) in which Iide clay from which coarse particles have been removed is dispersed in water. As a dispersing machine, for example, known apparatuses such as a high-speed mixer, a disperser, a bead mill, and a homomixer may be used similarly to the case of the first slurry.

The solid content concentration of the second slurry is not particularly limited, and, for example, is from 5 to 30 mass %.

The dispersion state of particles (Iide clay) in the slurry significantly influences the precision of subsequent centrifugation. Thus, a surfactant is preferably added as a dispersant in preparing the second slurry.

In a case where Iide clay includes a cationic polymer flocculant, an anionic surfactant is preferably used as the surfactant. In particular, a polymer anionic surfactant (anionic polymeric surfactant) is preferably used from the perspective of obtaining a stable slurry by using a small amount of the surfactant.

Even in a case where Iide clay does not include a cationic polymer flocculant, an anionic polymeric surfactant is preferably added from the perspective of maintaining the highly dispersed state of the obtained second slurry and facilitating stable removal of fine sand in centrifugation described later.

Addition of the anionic polymeric surfactant can provide a second slurry having a higher concentration, and thus provides an effect of enhancing productivity in drying using, for instance, a spray-dryer described later.

Specific examples of the anionic polymeric surfactant include POIZ 520, 521, 530, and 532A (available from Kao Corporation), which are special polycarboxylate type surfactants, from the perspective of obtaining a stable second slurry that does not cause sedimentation even when left standing.

KAOCER 2000, 2020, 2110 (available from Kao Corporation), or the like, which includes no metal ion such as sodium or potassium, may be used depending on the application.

The surfactant content of the second slurry is not particularly limited, and is preferably, for example, from 0.5 to 3.0 mass % relative to the total solid content of the second slurry.

When the surfactant content is too small, the dispersion of particles of halloysite and fine sand in the second slurry may be insufficient. On the other hand, when the surfactant content is too large, the surfactant may cause aggregation or costs may increase. In such a case, the surfactant may further cause problems in subsequent processes (for example, decrease in recovery rate of a dispersed phase in centrifugation, insufficient drying in spray-drying, or insufficient compaction or burning in firing).

<<Centrifugation>>

The obtained second slurry is subjected to centrifugation, thereby being separated into a sedimented phase of a lower layer and a dispersed phase of an upper layer. The sedimented phase includes a large amount of fine sand and the dispersed phase includes a large amount of halloysite. The solid content concentration of the dispersed phase (slurry) is, for example, from 2 to 10 mass %.

The centrifugal force and treatment time for centrifugation are respectively from 2000 to 3000 G and from 3 to 30 minutes, for example, but are not limited to these numerical ranges. They are appropriately determined taking into account a dispersion state, application, costs, and the like.

A large-size centrifugal separator may be used for mass production.

After centrifugation, a dispersed phase can be recovered by suction using a pump or the like. A skimming nozzle may be used for recovering the dispersed phase. Halloysite may be thus purified and separated from Iide clay including halloysite and fine sand. The fact that the recovered dispersed phase includes a halloysite nanotube can be confirmed by, for example, a transmission electron microscope (TEM) image (see, FIGS. 1 and 2).

Other Embodiments

The slurry preparation step is not limited to the embodiments described above. For example, in a case where a raw material other than Iide clay is used, the solid content concentration of the second slurry, the surfactant content of the second slurry, the centrifugation condition, and the like may be modified accordingly.

Reduction of processes (for example, omission of preparation of the first slurry, sieving, and/or filtering), addition of a process, or the like may be modified appropriately.

For example, halloysite (halloysite nanotube), commercially available from Sigma-Aldrich Co. LLC., may be dispersed in water by using a known apparatus and used as a slurry prepared in this step. Commercially available halloysite nanotubes may be subjected to dry purification, classification, magnetic separation, color sorting, or the like as necessary and used.

The slurry prepared in the slurry preparation step may be subjected to wet purification, classification, magnetic separation, or the like as necessary and used.

<Powder Preparation Step>

The powder preparation step is a step of preparing powder from the slurry prepared in the slurry preparation step. In a case where a firing step described later is omitted, the powder obtained in this step is to be the halloysite powder of the present invention.

The powder obtained in the powder preparation step may be granulated by further performing treatments such as tumbling, stirring, and extruding as long as the first pore and the second pore described later are maintained. Thus, granules constituting the powder can be increased in size.

<<Spray-Drying>>

Examples of the powder preparation step include a step of spray-drying the slurry prepared in the slurry preparation step (for example, the dispersed phase obtained by centrifugation) to obtain powder.

In spray-drying the prepared slurry, a spray-dryer is used. The spray-dryer is an apparatus that instantly produces powder by spraying a liquid raw material in the form of minute droplets (i.e., forming the material into fine particles) and drying the droplets through application of hot air. The spray-dryer is a known apparatus, and examples thereof include spray-dryers available from Ohkawara Kakohki Co., LTD., Fujisaki Electric Co., LTD., Japan Chemical Engineering & Machinery Co., Ltd., and Yamato Scientific Co., Ltd.

In the spray-dryer, the size of the powder particles (granules) obtained by drying can be controlled by changing the size of the droplets obtained by spraying the liquid raw material (i.e., forming fine particles).

The method of forming the liquid raw material into fine particles by using a spray-dryer is not particularly limited. For example, a known method such as a two-fluid nozzle method, a pressure nozzle (compression nozzle) method, a four-fluid nozzle method (twin-jet nozzle method), or a rotating disc method can be appropriately selected according to the size of droplets desired. The size of the powder particles (granules) obtained by drying depends on, for example, the concentration of the slurry and/or the amount of the slurry to be treated. Thus, in addition to selecting an appropriate method for forming fine particles, the state of the slurry is appropriately selected to achieve a desired particle size.

For the method of contacting hot air and sprayed droplets, a typically-employed concurrent flow method in which both of hot air and sprayed droplets are directed downward; a countercurrent flow method in which sprayed droplets are directed downward and the hot air is directed upward, that is, the flows of the hot air and sprayed droplets are countercurrents; a mixed flow method in which sprayed droplets are directed upward and hot air is directed downward; and the like are appropriately selected.

In spray-drying, heat is instantaneously applied, and therefore the powder itself does not reach a high temperature. In spray-drying, the powder is directly obtained by drying the slurry, and therefore treatments such as filtering, drying, and pulverizing are eliminated, preventing contamination that may occur during a series of the operations.

<<Media Fluidized Drying>>

The method of preparing powder from the slurry is not limited to the spray-drying described above as long as the halloysite powder of the present invention described later can be obtained, and, for example, media fluidized drying (drying using a fluidized bed including balls) may be employed.

The powder preparation step may be a step of media-fluidized-drying the slurry prepared in the slurry preparation step to obtain powder.

In summary, the media fluidized drying involves, for example, continuously supplying a slurry to be dried into a layer of ceramic balls (φ1 to 3 mm) in a fluidized state, and thus adhering the slurry on the surface of the balls. Objects to be dried are instantly dried by heat conduction from the heated balls and convective heat transfer from fluidization hot air, and then peeled off from the surface of the balls by collision among the balls. The powder is thus obtained.

<Firing Step>

The production method of the present invention may further include a step of firing the powder obtained in the powder preparation step (firing step).

For example, in a case where a surfactant is used for the preparation of the second slurry described above, the surfactant may also remain in the powder obtained by spray-drying or the like. Such a surfactant can be removed by further performing firing.

The firing temperature is preferably not higher than 420° C. at which the crystalline structure of halloysite is maintained in the XRD measurement after firing. The lower limit of the firing temperature is not particularly limited, and, for example, is not lower than 200° C. The firing time is, for example, approximately from 0.5 to 2 hours.

In a case of going through such a firing step, the powder obtained through the firing step is to be the halloysite powder of the present invention.

[Halloysite Powder]

Next, the halloysite powder of the present invention obtained by the production method of the present invention will be described.

The halloysite powder of the present invention (hereinafter, also simply referred to as "the powder of the present invention") is a halloysite powder including a granule that is an aggregate of halloysite including a halloysite nanotube, wherein the granule includes a first pore derived from a tube hole of the halloysite nanotube, and a second pore different from the first pore.

In the present specification, an aggregate of a plurality of "granules" is referred to as "powder."

<SEM>

The fact that the granule included in the powder of the present invention (hereinafter, also referred to as "the granule of the present invention" for convenience) is a granule constituted of an aggregate of halloysite including a halloysite nanotube, and includes a pore derived from the tube hole of the halloysite nanotube (first pore) can be confirmed with the Scanning Electron Microscope (SEM) images (see, FIGS. 3 to 5), for example.

Figure 3:
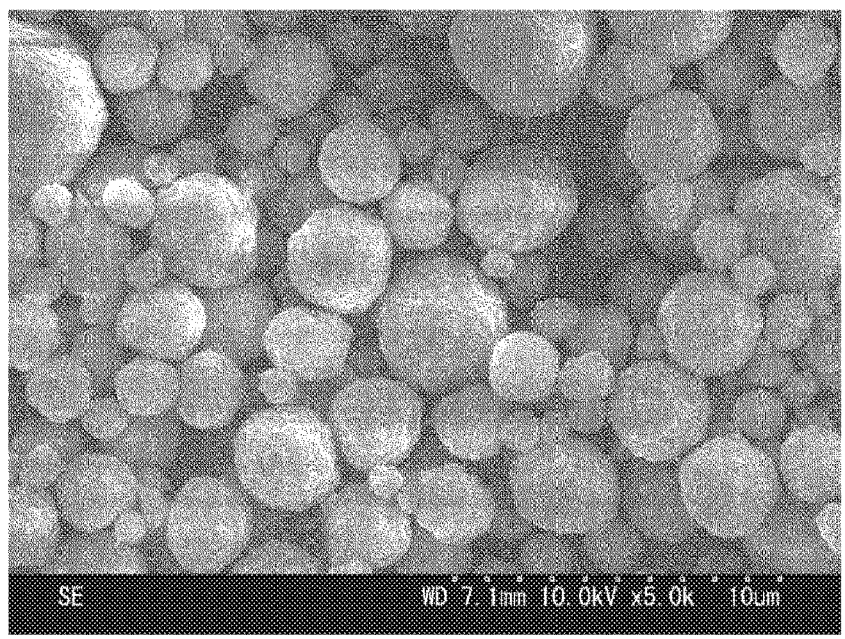
FIG. 3 is an SEM image showing halloysite powder of Example 1.
Figure 4:
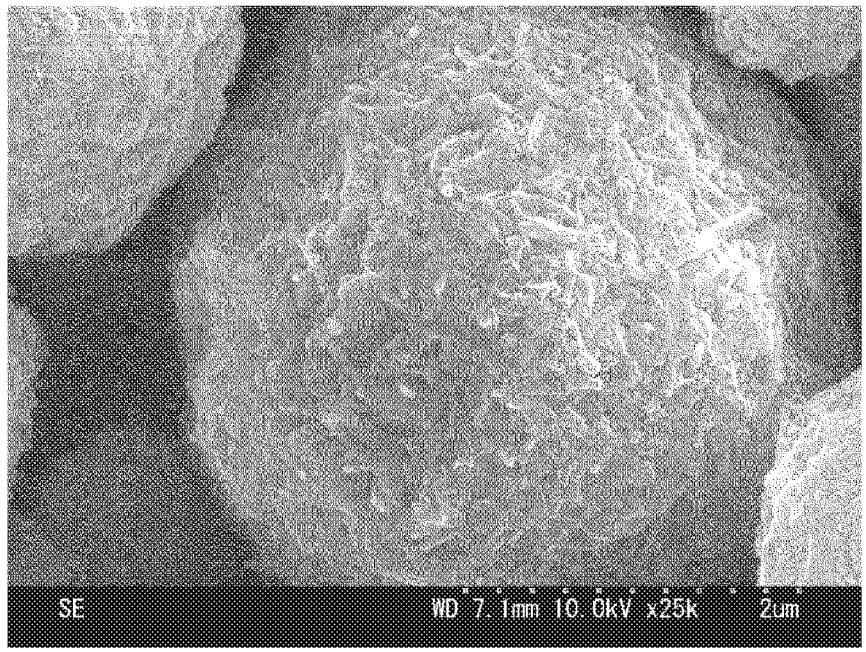
FIG. 4 is an SEM image showing the halloysite powder of Example 1 and is an enlarged image of FIG. 3.
Figure 5:
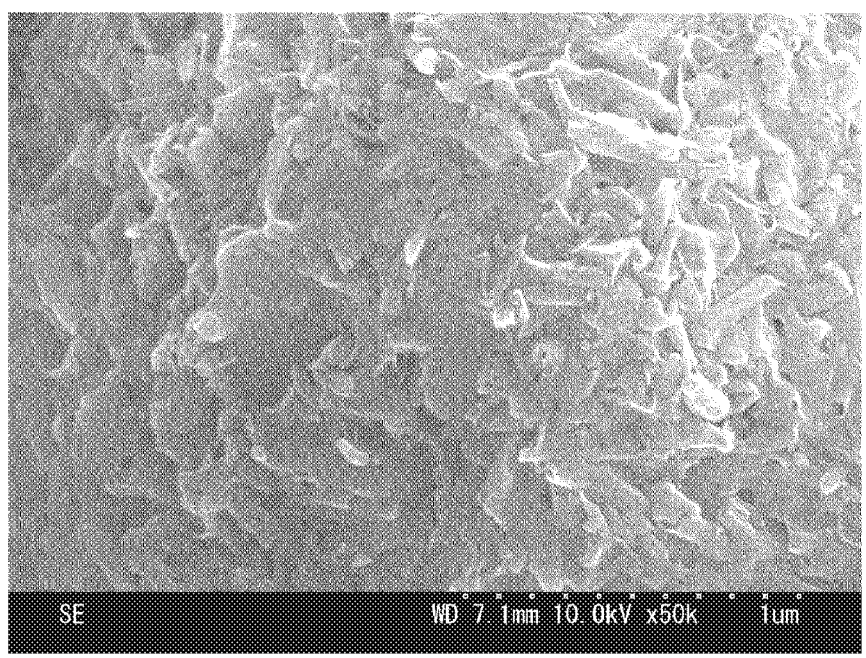
FIG. 5 is an SEM image showing the halloysite powder of Example 1 and is an enlarged image of FIG. 4.

FIGS. 3 to 5 are SEM images showing the halloysite powder of the present invention (halloysite powder prepared by spray-drying in Example 1 described later). FIG. 4 is an enlarged image of FIG. 3, and FIG. 5 is an enlarged image of FIG. 4.

In FIGS. 3 and 4, spherical granules are observed. In FIGS. 4 and 5, the fact that the granules are each an aggregate of halloysite including a halloysite nanotube can be confirmed. Further, in FIGS. 4 and 5 (especially, FIG. 5), the tube holes of the halloysite nanotubes (first pores derived from the tube holes of the halloysite nanotubes) can be observed on the surface of the granule.

Figure 20:
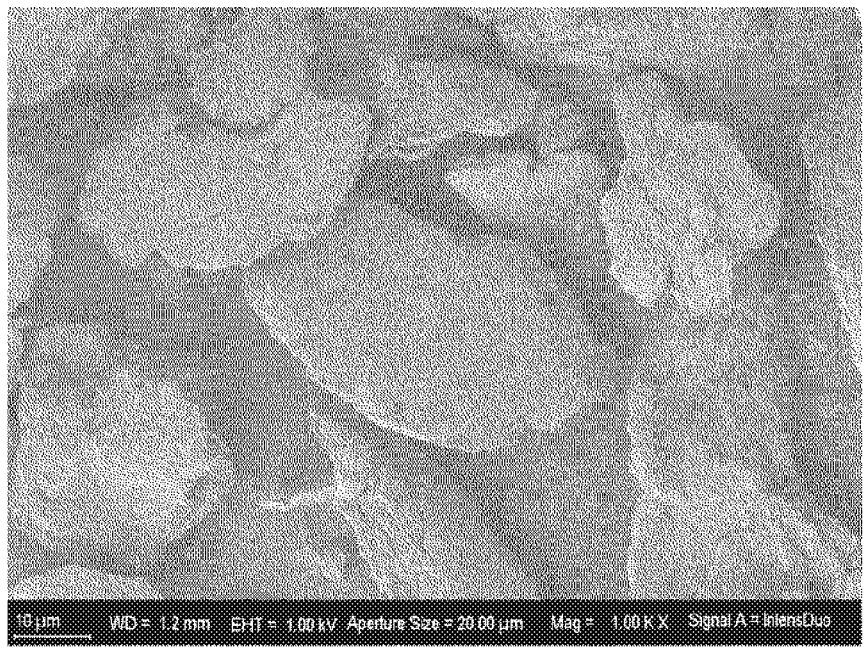
FIG. 20 is an SEM image showing the halloysite powder of Example 10.
Figure 21:
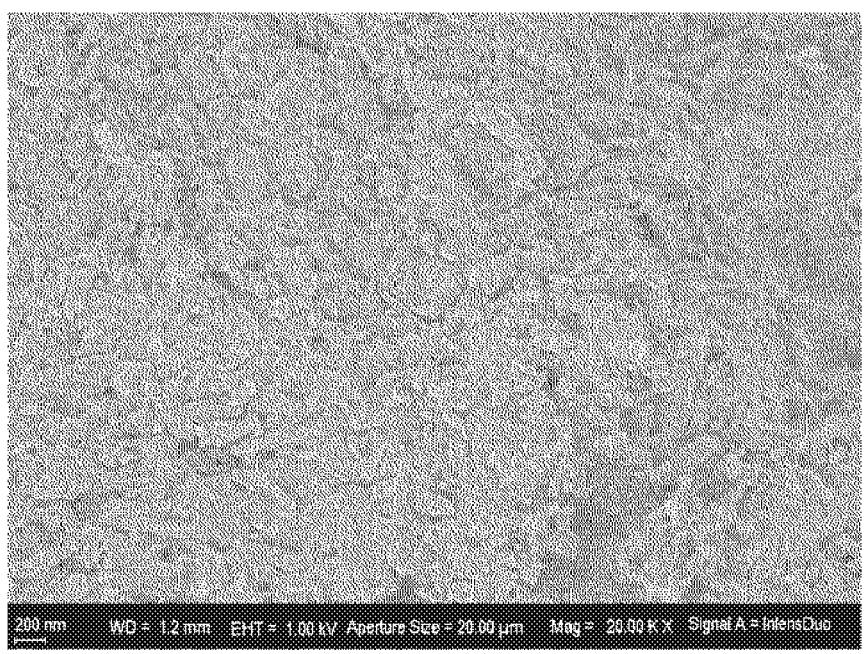
FIG. 21 is an SEM image showing the halloysite powder of Example 10 and is an enlarged image of FIG. 20.

FIGS. 20 and 21 are also SEM images showing the halloysite powder of the present invention (halloysite powder prepared by media fluidized drying in Example 10 described later). FIG. 21 is an enlarged image of FIG. 20.

The granules shown in FIG. 20, which have been peeled off from the surface of balls in the process of preparing by media fluidized drying, have a plate-like shape.

With FIG. 21, the fact that the granule is an aggregate of halloysite including a halloysite nanotube can be confirmed. Further, the tube holes of the halloysite nanotubes (first pores derived from the tube holes of the halloysite nanotubes) can also be observed on the surface of the granule.

The reason why such a granular structure including the first pore is obtained is that spray-drying or media-fluidized-drying a slurry including halloysite nanotubes allows the halloysite nanotubes to aggregate with their tube shape maintained.

Figure 6:
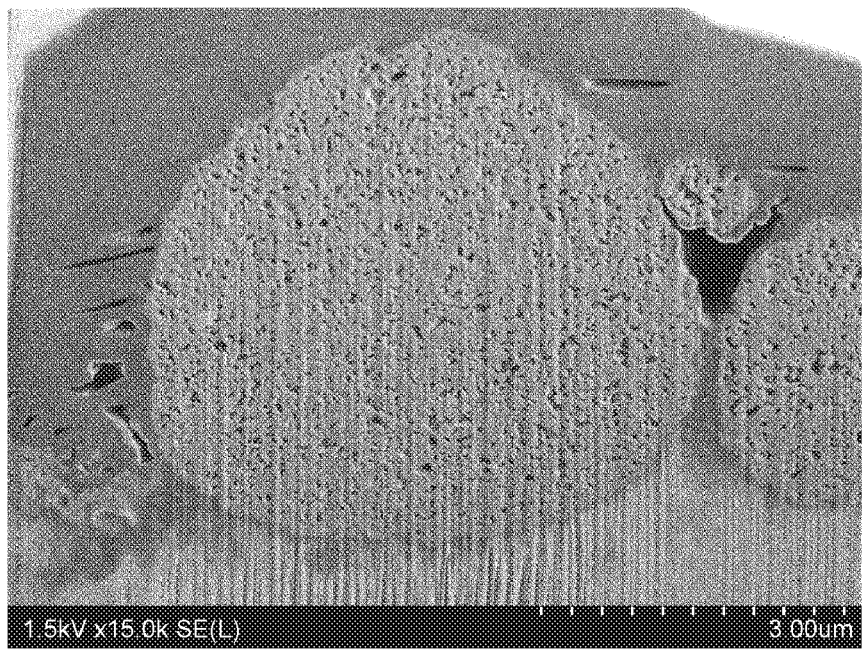
FIG. 6 is an SEM image showing the cross section of a granule included in the halloysite powder of Example 1.
Figure 7:
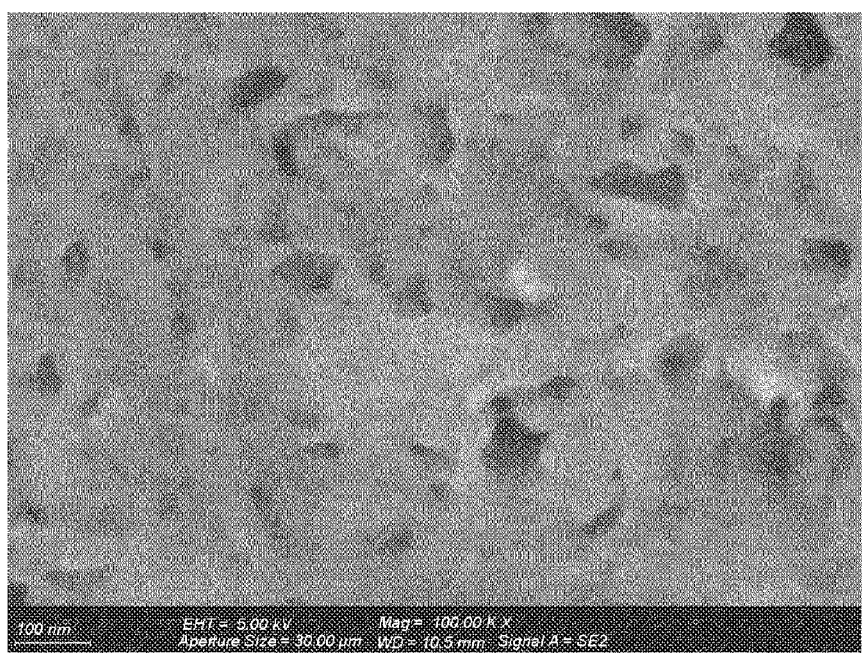
FIG. 7 is an SEM image showing the cross section of the granule included in the halloysite powder of Example 1 and is an enlarged image of FIG. 6.
Figure 8:
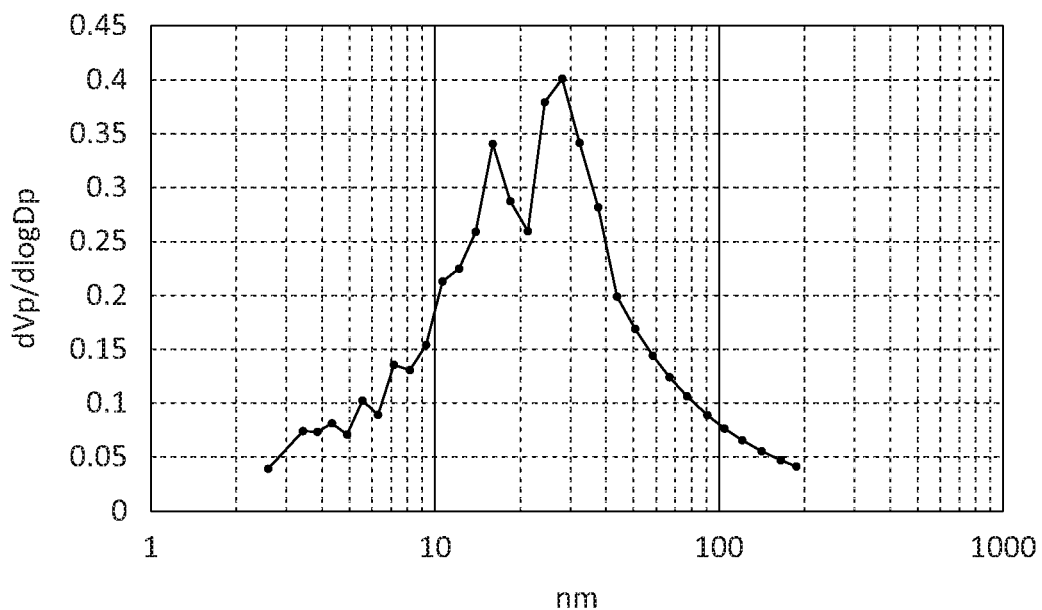
FIG. 8 is a graph showing the differential pore distribution of the halloysite powder of Example 1.
Figure 9:
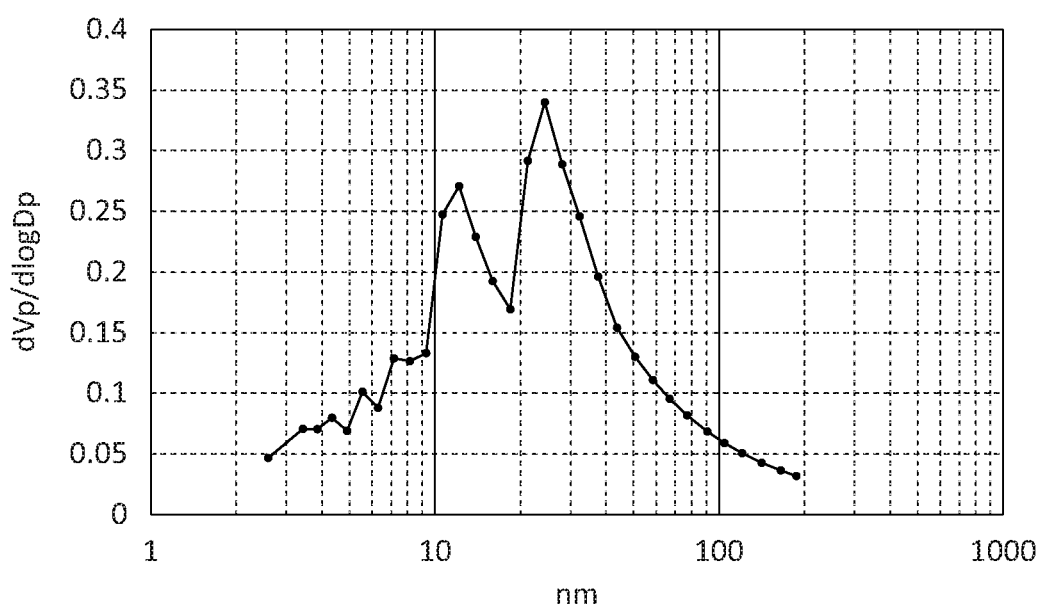
FIG. 9 is a graph showing the differential pore distribution of halloysite powder of Example 2.
Figure 10:
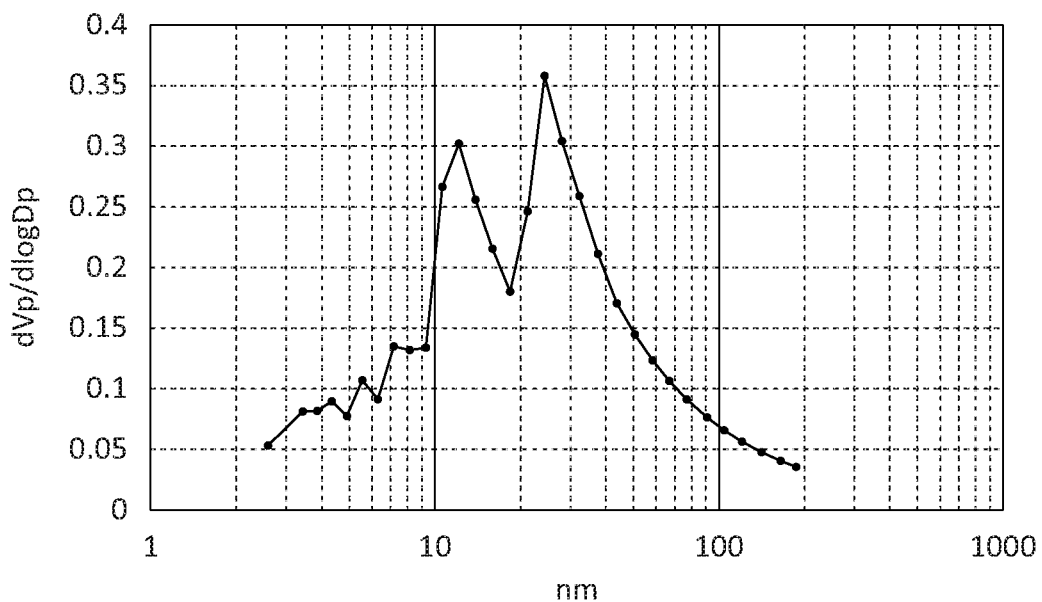
FIG. 10 is a graph showing the differential pore distribution of halloysite powder of Example 3.
Figure 11:
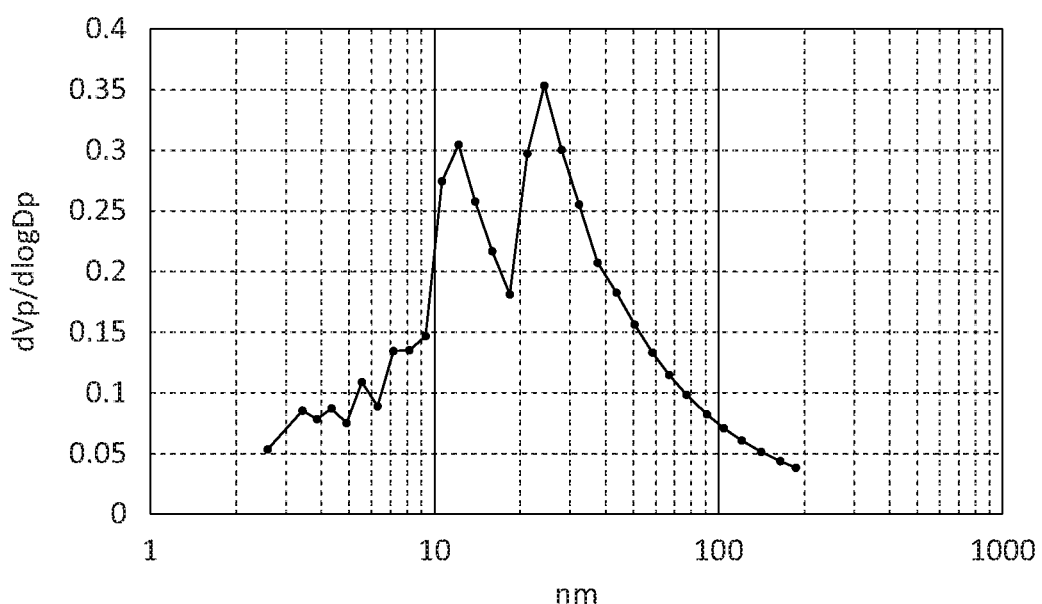
FIG. 11 is a graph showing the differential pore distribution of halloysite powder of Example 4.
Figure 12:
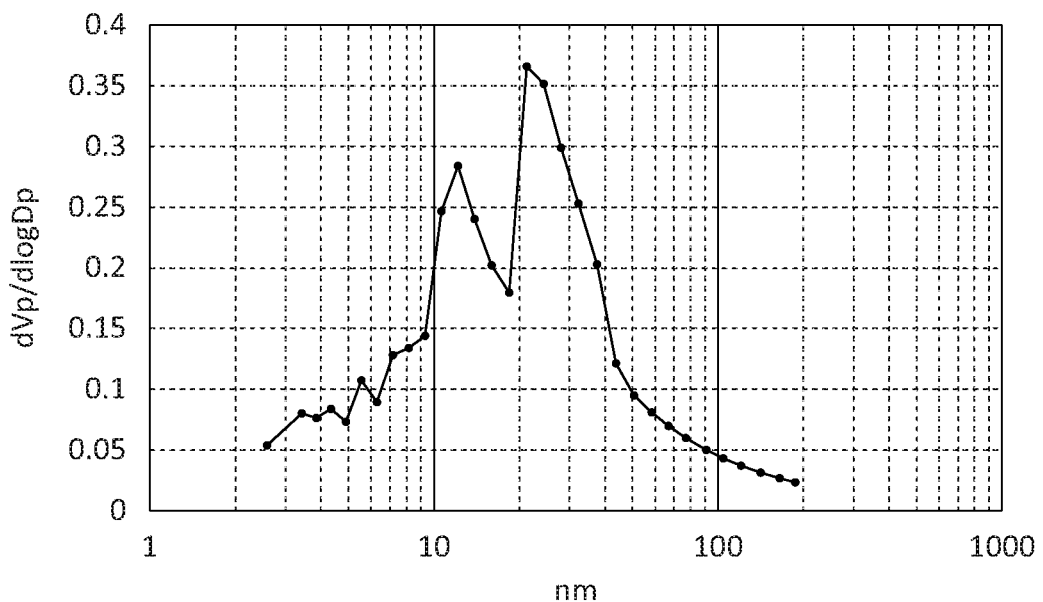
FIG. 12 is a graph showing the differential pore distribution of halloysite powder of Example 5.
Figure 13:
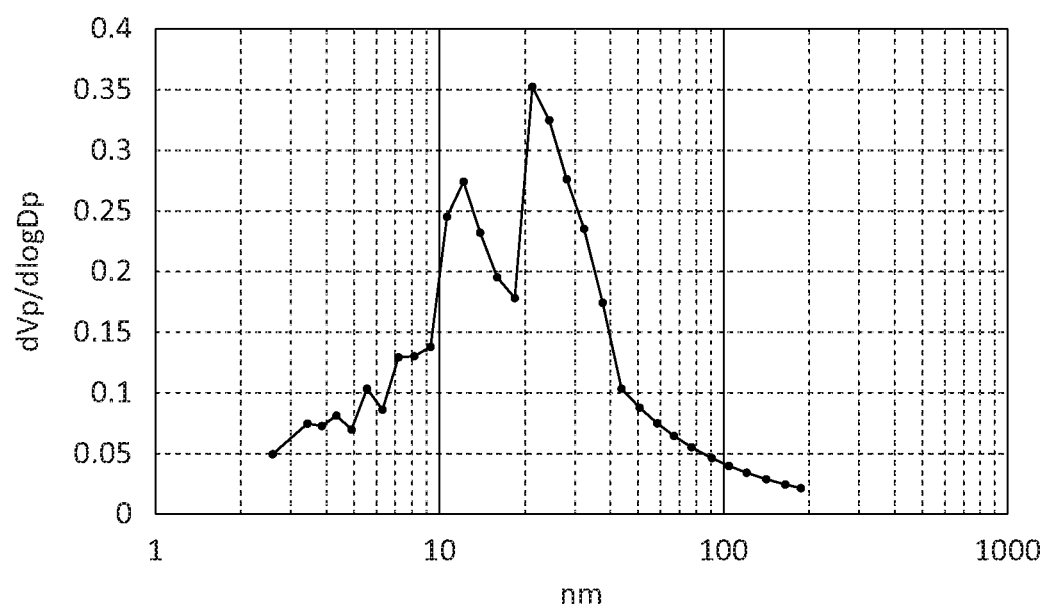
FIG. 13 is a graph showing the differential pore distribution of halloysite powder of Example 6.

The fact that the granule of the present invention further includes the second pore different from the first pore can be confirmed, for example, in SEM images of the cross section of the granule (see, FIGS. 6 and 7). The cross section of the granule is exposed by, for example, processing the granules with Focused Ion Beams (FIB).

FIGS. 6 and 7 are SEM images showing the cross section of the granule included in the halloysite powder of the present invention (halloysite powder of Example 1 described later). FIG. 7 is an enlarged image of FIG. 6.

In FIGS. 6 and 7 (especially, FIG. 7), pores (second pores) with a larger size than that of the tube hole of the halloysite nanotube (normally, the inner diameter is approximately from 10 to 20 nm) can be observed at the cross section of the granule.

The reason why the second pore as above is obtained is that the dispersion medium of a slurry is evaporated and removed from the granule (inside of the granule) when the slurry is formed into granules by spray-drying or media fluidized drying.

<Pore Distribution Measurement>

The fact that the granule included in the powder of the present invention has the specific structure described above can be confirmed from the results obtained by measuring the pore distribution of the powder of the present invention (see, FIGS. 8 to 17).

It is preferable for the powder of the present invention that the differential pore distribution (log differential pore volume distribution) determined from a nitrogen adsorption isotherm by the BJH method exhibit two or more pore size peaks in a range from 10 to 50 nm. The details of the measurement will be described below.

FIGS. 8 to 17 are graphs showing the differential pore distributions (log differential pore volume distributions) determined from a nitrogen adsorption isotherm by the BJH method for the halloysite powder of the present invention (halloysite powders of Examples 1 to 10 described later). The horizontal axis represents pore size (nm), and the vertical axis represents differential pore volume (dVp/d log Dp) (cm$^3$/g) (the same applies hereinafter).

In the graphs of FIGS. 8 to 13, 15, and 17 (Examples 1 to 6, 8, and 10), two pore size peaks appear in the range from 10 to 50 nm. Two pore size peaks are also in the range from 10 to 40 nm.

The peak with a smaller pore size (pore size peak in the range from 10 nm to 20 nm) represents the first pore derived from the tube hole of the halloysite nanotube (inner diameter: approximately from 10 to 20 nm), and the peak with a larger pore size (pore size peak in the range greater than 20 nm) represents the second pore different from the tube hole.

Figure 14:
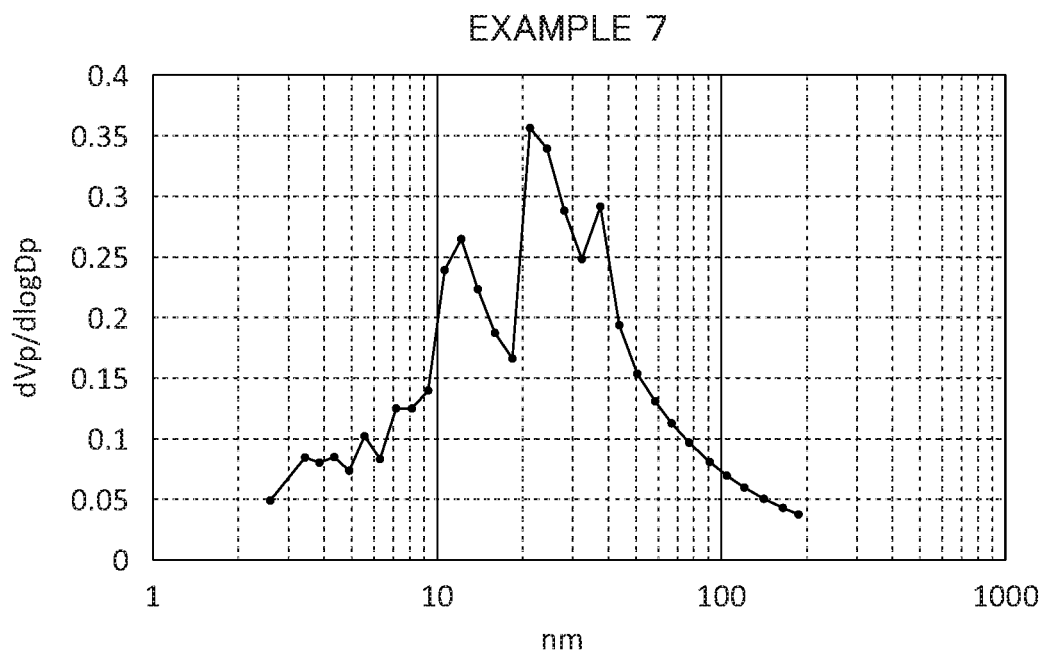
FIG. 14 is a graph showing the differential pore distribution of halloysite powder of Example 7.
Figure 15:
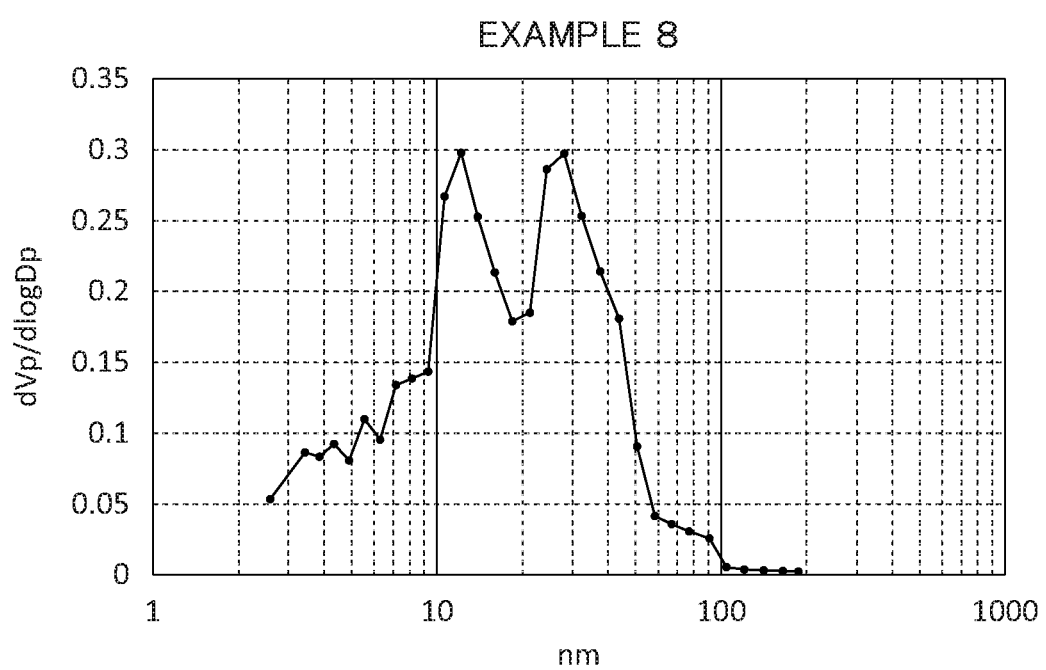
FIG. 15 is a graph showing the differential pore distribution of halloysite powder of Example 8.

In the graph of FIG. 14 (Example 7), three pore size peaks appear in the range from 10 to 50 nm (10 to 40 nm). It is understood that the pore size peak in the range from 10 nm to 20 nm represents the first pore, and the two pore size peaks in the range greater than 20 nm both represent the second pores. That is, it is understood that, in the halloysite powder of Example 7, the second pores are formed in the granule, and the pore sizes thereof are roughly classified into two types. It is presumed that the viscosity of the slurry used in preparation of the halloysite powder, the dispersibility of the particles, and the like affect the second pore.

Figure 16:
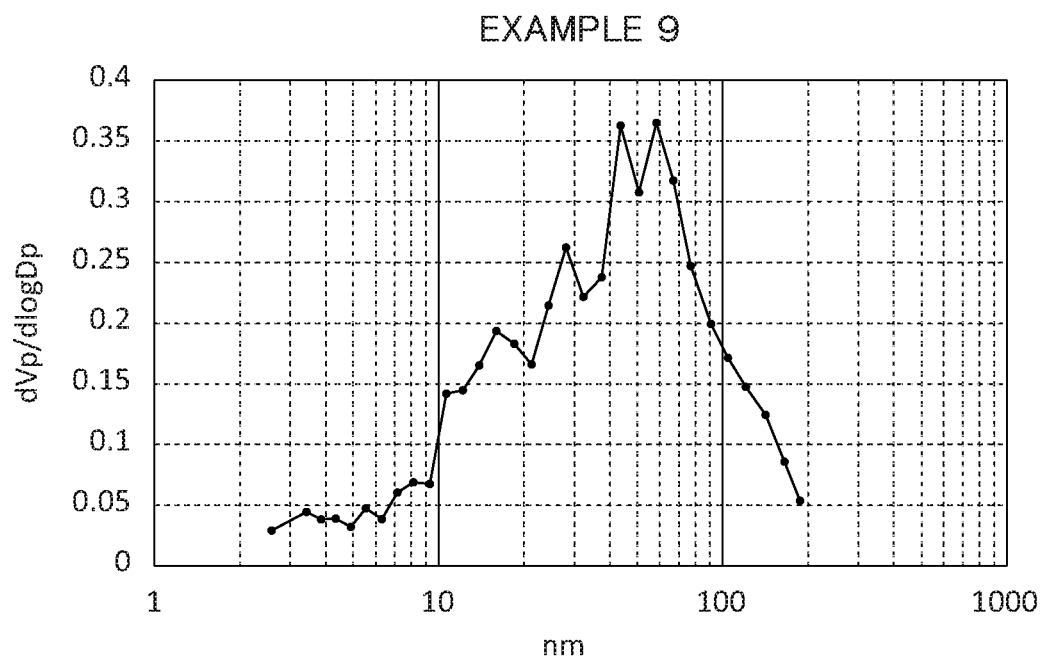
FIG. 16 is a graph showing the differential pore distribution of halloysite powder of Example 9.
Figure 17:
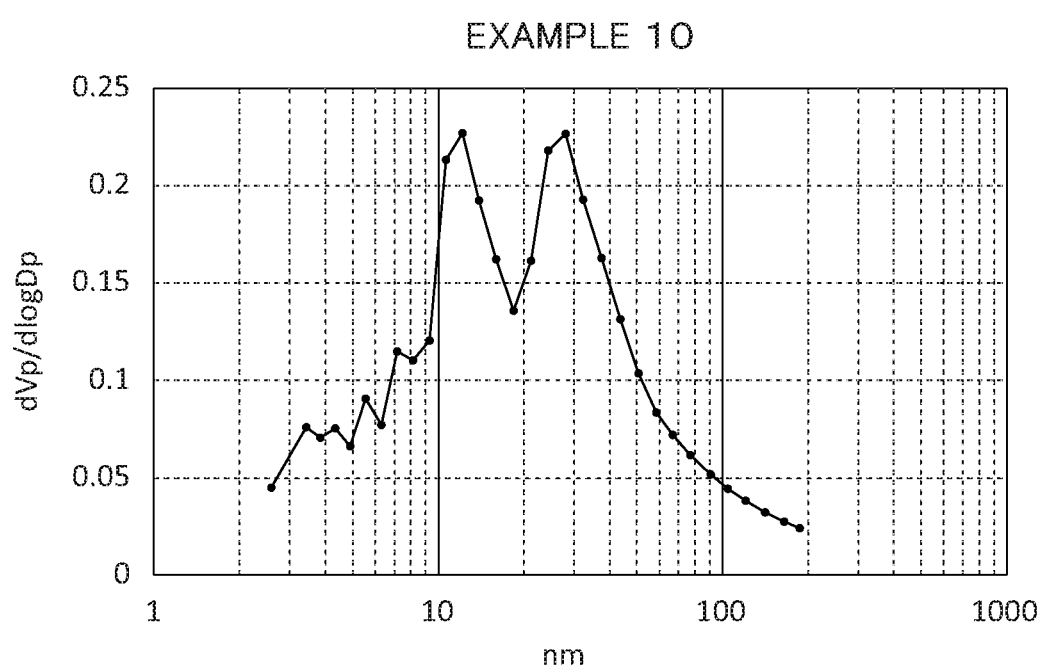
FIG. 17 is a graph showing the differential pore distribution of halloysite powder of Example 10.

In the graph of FIG. 16 (Example 9), three pore size peaks appear in the range from 10 to 50 nm, and one pore size peak also appears in the range greater than 50 nm.

It is understood that the pore size peak in the range from 10 nm to 20 nm represents the first pore, and all of the three pore size peaks in the range greater than 20 nm represent the second pores. Among the three peaks, two pore size peaks in the range greater than 40 nm are supposedly peaks derived from impurities such as quartz. That is, probably, the halloysite powder of Example 9 prepared by spray-drying a slurry different from Examples 1 to 8 and 10 includes impurities such as quartz, the impurities are incorporated into the granule to form the second pores, and therefore the peaks derived from the second pores appear.

Therefore, from the perspective of achieving high purity, the halloysite powder of the present invention preferably has two or more pore size peaks in the range from 10 to 40 nm, and more preferably has two pore size peaks in the range from 10 to 40 nm.

In such a case, the pore size peak corresponding to the first pore preferably appears in the range from 10 nm to 20 nm, and the pore size peak corresponding to the second pore preferably appears in the range of greater than 20 nm and not greater than 40 nm.

Figure 18:
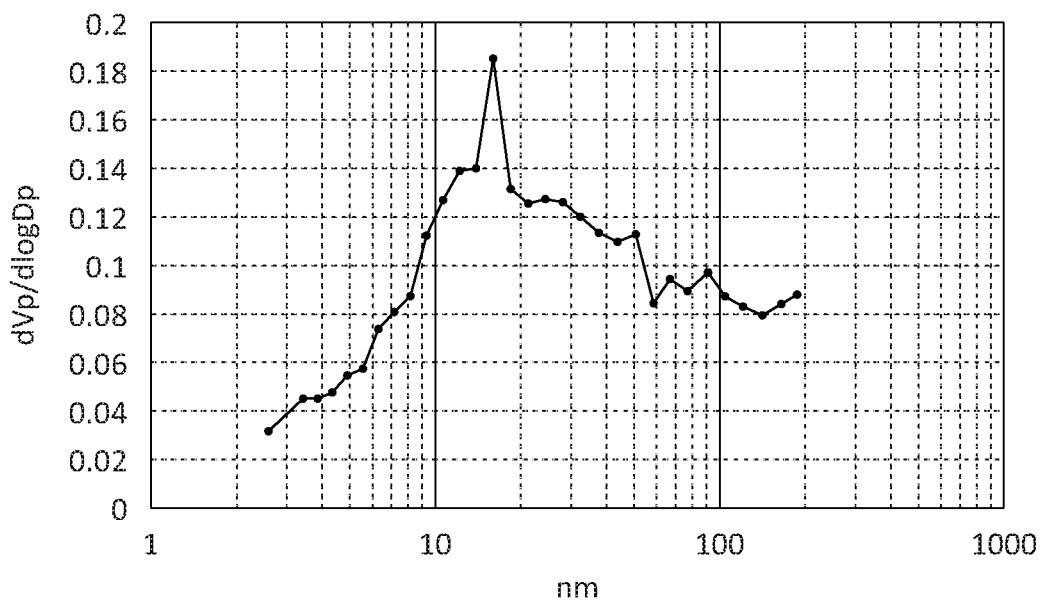
FIG. 18 is a graph showing the differential pore distribution of halloysite powder of Comparative Example 1.

In the graph of FIG. 18 (Comparative Example 1), a pore size greater than 100 nm is observed. The reason is presumed as follows.

In the measurement of pore distribution of the halloysite powder, voids formed between granules may be measured. However, for example, the granules of the halloysite powders of Examples 1 to 8 have an average particle size of not less than 3.0 μm as described later, and therefore the size of the voids formed between the granules is of micrometer order, which is beyond the measurement range (measurement limit) of the pore distribution.

In contrast, the halloysite powder of Comparative Example 1 are commercially available halloysite nanotubes as it is, and the particle size thereof is relatively small as described later. Therefore, voids with a relatively large size tend to be formed between particles in the measurement range of the pore distribution (for example, approximately from 100 nm to 200 nm). This is probably the reason why, in the graph of FIG. 18 (Comparative Example 1), a pore size (void) greater than 100 nm appears.

Compared to the powder of Comparative Example 1 which includes commercially available halloysite nanotubes as it is (including no second pore), the powder of the present invention includes the second pore, and therefore has a large total pore area and total pore volume described later. This point makes it possible to distinguish those powders.

Specifically, the total pore area of the powder of the present invention is preferably not less than 59.0 m$^2$/g, more preferably not less than 65.0 m$^2$/g, and even more preferably not less than 75.0 m$^2$/g. The upper limit of the total pore area is not particularly limited, and, for example, is not greater than 200.0 m$^2$, and preferably not greater than 150.0 m$^2$/g.

The total pore volume of the powder of the present invention is preferably not less than 0.20 cm$^3$/g, and more preferably not less than 0.23 cm$^3$/g. The upper limit of the total pore volume is not particularly limited, and, for example, is not greater than 0.80 cm$^3$/g, and preferably not greater than 0.60 cm$^3$/g.

In addition, the average pore size of the powder of the present invention is, for example, not less than 5.0 nm and preferably not less than 11.0 nm. The upper limit of the average pore size is not particularly limited, and, for example, is not greater than 30.0 nm, and preferably not greater than 20.0 nm.

The BET specific surface area (specific surface area determined by the BET method) of the powder of the present invention is, for example, from 30 to 200 m$^2$/g, and preferably from 50 to 150 m$^2$/g.

Next, the method of measuring pore distribution, and the like will be described.

A pretreatment (vacuum-deairation at 120° C. for 8 hours) is first performed on powder, and then a nitrogen adsorption-desorption isotherm is measured by a constant volume method under the following conditions. The equilibrium waiting time refers to the waiting time after reaching an adsorption equilibrium state.

The BET specific surface area (m$^2$/g) is determined by applying the BET method using the nitrogen adsorption isotherm.

The average pore size (nm) is calculated from the values of the BET specific surface area and the total pore volume (cm$^3$/g). The total pore volume used for calculation of the average pore size (for convenience, also referred to as "total pore volume for calculation") is determined from the adsorption amount at a relative pressure of 0.99 on the adsorption isotherm, assuming that capillary condensation occurs in pores that are present at relative pressures up to 0.99 on the adsorption isotherm.

Furthermore, the log differential pore volume distribution, the total pore volume (cm$^3$/g), and the total pore area (m$^2$/g) are determined by applying the BJH method using the FHH reference curve from the nitrogen adsorption isotherm. The standard conditions of analysis software are used for the plot intervals of the pores of approximately from 2.6 nm to 200 nm in size. Note that the total pore volume and the total pore area determined by the BJH method are respectively referred to as "BJH total pore volume" and "BJH total pore area."

In the present invention, in the case of simply referring to "total pore volume" and "total pore area", the "total pore volume" and the "total pore area" respectively mean the "BJH total pore volume" and the "BJH total pore area" unless noted otherwise.

Adsorption temperature: 77 K
Nitrogen cross-sectional area: 0.162 nm$^2$
Saturated vapor pressure: Measured
Equilibrium waiting time: 500 sec
Pretreatment instrument: BELPREP-vacll (available from MicrotracBEL Corp.)
Measurement instrument: BELSORP-mini (available from MicrotracBEL Corp.)
Analysis software: BELMaster Version 6.4.0.0 (available from MicrotracBEL Corp.)

<Average Particle Size>

The average particle size of the granules constituting the powder of the present invention is not particularly limited, and appropriately selected depending on the application. The average particle size is, for example, from 0.5 to 200 μm. In a case where the powder of the present invention is prepared by spray-drying, the average particle size is preferably from 1 to 100 μm. The granules having such particle sizes may be increased in size through the granulation described above. Note that, in this case, the average particle size is preferably not greater than 5 mm.

The average particle size is determined as follows. First, powder is dry-sieved by hand, using test sieves with apertures of 2.8 mm, 1 mm, 500 μm, 250 μm, and 125 μm defined in JIS Z 8801. Then, the mass of each of the powders remaining on the sieves is measured, the mass fraction is determined, and the average particle size is a particle size at which the cumulative mass percentage passed through the sieves is equal to mass fraction of 50%.

Note that fine powder may cause clogging of a sieve. Thus, in a case where the powder is prepared by spray-drying (excluding a powder produced by granulation), the average particle size is dry-measured by using a laser diffraction-scattering type particle size distribution measuring apparatus (Microtrac MT3200) and a sample supplying machine (One-Shot Dry), available from MicrotracBEL Corp.

<Bulk Density>

In a case where the powder is prepared by spray-drying, for example, particles constituting the halloysite powder of the present invention are spherical granules having roundness. In this case, the halloysite powder of the present invention tends to have a greater bulk density than the powder including tube-shaped halloysite which is not granules.

The initial bulk density of the powder of the present invention is preferably not less than 0.35 g/cm$^3$, more preferably not less than 0.40 g/cm$^3$, and more preferably not less than 0.45 g/cm$^3$.

The tap bulk density of the powder of the present invention is preferably not less than 0.50 g/cm$^3$, more preferably not less than 0.60 g/cm$^3$, even more preferably not less than 0.70 g/cm$^3$, and particularly preferably not less than 0.75 g/cm$^3$.

The initial bulk density of the powder is determined as follows. First, powder is poured in a cylindrical container with a known volume in a free fall, until the powder overflows. At that time, it is advised to avoid imparting vibration or compressing the powder. Extra powder that is present above the upper end plane of the cylindrical container is removed along the plane without compressing the powder, and the mass of the powder in the container is measured. The initial bulk density is determined from the mass of the powder and the volume of the cylindrical container by using the following equation. This measurement was performed three times and the average value is calculated. The calculated average value is defined as the initial bulk density of the present invention.

Initial bulk density=mass of powder (g)/volume of cylindrical container (cm$^3$)

The tap bulk density of the powder is determined as follows. First, powder is placed in a cylindrical container that allows the volume of the content therein to be readable, and the mass of the powder at that time is measured. Then, impact is applied to the cylindrical container containing the powder by performing a tapping operation (tapping the bottom of the cylindrical container lightly on the work bench). This tapping operation is repeated until the height of surface of the powder in the cylindrical container does not substantially change. Thereafter, the volume of the powder in the cylindrical container is measured, and the tap bulk density is determined from the mass and volume of the powder by using the following equation. This measurement was performed three times and the average value is calculated. The calculated average value is defined as the tap bulk density of the present invention.

Tap bulk density=mass of powder (g)/volume of powder (cm$^3$)

<Angle of Repose>

For the same reason as the logic for the bulk density, the halloysite powder of the present invention tends to have a small angle of repose. The angle of repose of the powder of the present invention is preferably not greater than 55°, and more preferably not greater than 50°.

The angle of repose refers to an angle formed between the surface of a conical pile formed by piling powder on a flat surface, and a horizontal surface. The angle of repose is used as an index of flowability. Better flowability of the powder results in a smaller angle of repose, whereas poor flowability of the powder results in a larger angle of repose.

The value of the angle of repose significantly depends on the method of forming the conical pile. In the present invention, the angle of repose is determined as follows.

A conical pile is carefully formed by pouring powder from a spoon or the like in a free fall. At that time, to minimize impact of the powder falling on the tip portion of the conical pile, the fall height is set to a range approximately from 2 to 15 mm from the apex of the pile. When a pile having a stable inclination angle is formed, the maximum angle of the inclination angle is measured with a semicircular protractor meter. The formation of the pile and the measurement as described above were performed three times and the average value is calculated. The obtained average value is defined as the angle of repose.

<Purity>

Figure 19:
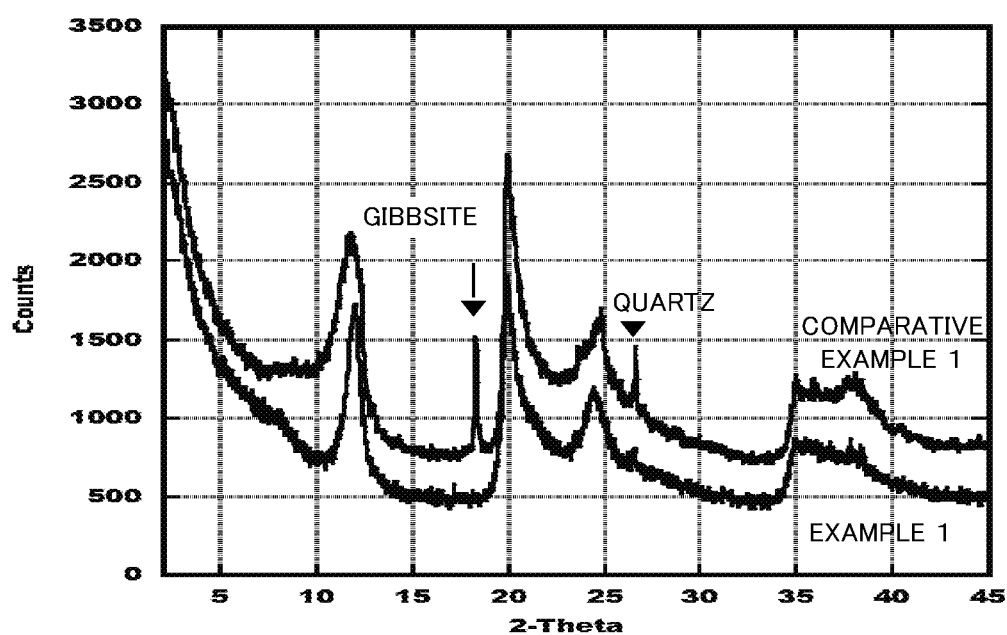
FIG. 19 is a graph showing the XRD patterns of the halloysite powders of Example 1 and Comparative Example 1.

It can be confirmed that the powder of the present invention obtained through a preferred embodiment of the production method of the present invention includes few impurities other than halloysite and has a high purity, from the result of the X-ray diffraction (XRD) measurement, for example (see, FIG. 19).

FIG. 19 is a graph showing the XRD patterns of the halloysite powder of the present invention (halloysite powder of Example 1 described later) and commercially available halloysite (halloysite powder of Comparative Example 1). As shown in FIG. 19, in the XRD pattern of the commercially available product, the peaks corresponding to gibbsite (Al(OH)$_3$)) and quartz (SiO$_2$) appear, whereas in the XRD pattern of the powder of the present invention, gibbsite is not detected and the peak corresponding to quartz is very small.

Accordingly, the powder of the present invention can be developed for applications requiring high purity, and the like.

<Quartz Content>

From the perspective of achieving high purity, specifically, the quartz content of the halloysite powder of the present invention is preferably not greater than 1.00 mass %, more preferably not greater than 0.70 mass %, and even more preferably not greater than 0.40 mass %.

On the other hand, the lower limit of the quartz content of the halloysite powder of the present invention is not particularly limited; it is preferable that quartz be not detected in the XRD measurement.

The quartz content of the halloysite powder is determined by the XRD measurement as follows.

First, filters for sample collection (glass fiber filters treated with fluororesin) are weighed. Then, each filter is placed in a Zn cell for XRD measurement, and a range including an angle (2θ=43.2 deg) at which Zn is detected is measured by XRD.

Then, samples (halloysite powder and a quartz reference standard which is a sample for forming a calibration curve) are each dispersed in water. Specifically, approximately 15 mg of halloysite powder is dispersed in pure water. Similarly, approximately 0.1 mg, 0.5 mg, 1.0 mg, 3.0 mg, and 5.0 mg of quartz reference standards (Japan Association for Working Environment Measurement, JAWE460 for free silicate analysis) are each dispersed in pure water.

Each sample dispersed in water is collected on the associated filter, which has been measured by XRD in advance, by suction filtration. The collected sample is dried together with the associated filter at 105° C. for 2 hours, and then weighed. The mass of the collected sample is calculated by subtracting the mass of the associated filter weighed in advance.

Then, the weighed sample is, together with the associated filter, placed in a Zn cell, and a range including an angle at which quartz is detected (first intense line 2θ=26.6 deg) and an angle at which Zn derived from the cell is detected (2θ=43.2 deg) is measured by XRD.

The peak integral intensity of quartz is corrected by using the peak integral intensity of a Zn plate (base standard plate) according to the base standard absorption correction method.

A calibration curve of the mass is prepared from the peak integral intensity of the quartz reference standard, and the quantitative value of the quartz in the halloysite powder is calculated by using the calibration curve. The measurement is performed three times, and the average value is defined as the quartz content of the halloysite powder.

The other specific conditions in the XRD measurement are as follows.

Instrument used: X-ray diffraction apparatus, SmartLab (available from Rigaku Corporation)
X-ray tube: CuKα
Optical system: Bragg-Brentano geometry
Tube voltage: 45 kV
Tube current: 200 mA
Detector: One-dimensional semiconductor detector
Scan range: 26.0 to 28.0 deg
Scan step: 0.01 deg
Scan speed: 5 deg/min <Application of Halloysite Powder>

The halloysite powder of the present invention can be developed for various applications. Examples of the application include cosmetics, coloring materials, nanoparticles for precision polishing, nanomagnetic materials, catalysts, catalyst supports, humidity-controlling materials, deodorants, deodorizers, adsorbents, sustained-release agents, antibacterial agents, pharmaceuticals, and artificial enzymes, but it goes without saying that the application is not limited thereto. The halloysite powder of the present invention is also suitable for fillers, coating materials, and the like, which impart characteristics such as weight reduction, thermal insulation, sound absorbing, and environmental cleaning.

For example, in a case where the halloysite powder of the present invention is used as a humidity-controlling material, the halloysite powder of the present invention exhibits a better humidity-control property than known halloysite nanotubes. It is conceived that inclusion of the first pore derived from a tube hole and the second pore different from the first pore in the granule included in the halloysite powder of the present invention yields such a better humidity-control property.

EXAMPLES

The present invention will be specifically described below while citing examples. However, the present invention is not limited thereto.

Preparation of Halloysite Powders of Examples 1 to 8: Spray-Drying

Halloysite powders of Examples 1 to 8 were produced as described below.

<<Raw Material (Iide Clay)>>

Iide clay described above was used as a raw material. XRD measurement of Iide clay was performed, and peaks (not illustrated) that represent halloysite and fine sand (quartz) were observed.

<<Preparation of First Slurry>>

Iide clay and water were charged into a high-speed mixer (available from NISSEI Corporation, Ultra Homomixer UHM-20 (20 L)), and subjected to a treatment for 10 minutes at 8000 rpm, and thereby a first slurry in which Iide clay was dispersed in water (solid content concentration: 10 mass %) was obtained.

<<Removing Coarse Particles>>

All of the first slurry was passed through a sieve for JIS test with an aperture of 45 um to remove coarse particles remaining on the 45 μm mesh (approximately 30%). At that time, to prevent clogging and facilitate recovery of particles having passed through the 45 μm mesh, operations of adding water on the sieve and brushing off the particles on the sieve with a brush were appropriately performed. In a case where a sieve with an aperture of 25 μm or 100 μm was used, the final quality was the same.

<<Filtering>>

Next, the first slurry including particles having passed through the 45 μm mesh was filtered with suction using a filter, and a dehydrated cake was recovered.

<<Preparation of Second Slurry>>

The dehydrated cake and water were charged into a high-speed mixer (available from NISSEI Corporation., Ultra Homomixer UHM-20), and an anionic polymeric surfactant (available from Kao Corporation, POIZ 520) was added thereto. The mixture was subjected to a treatment for 10 minutes at 10,000 rpm, and thereby a second slurry in which Iide clay was dispersed in water (solid content concentration: 20 mass %) was obtained. The content of the anionic polymeric surfactant relative to the total solid content of the second slurry was 1.5 mass %.

<<Centrifugation>>

The second slurry was stirred, 80 mL per one tube was collected from the second slurry during stirring, and the collected slurry was placed in a centrifuge (available from Kokusan Corp., small-size desktop centrifugal machine H-19α, rotor: RF-109L, bucket: MF-109L, tube: 100 mL×4, made from PP, outer diameter: 45 mm, inner diameter: 40 mm, height: 100 mm).

Centrifugation was performed at a centrifugal force of 2470 G for 10 minutes to separate the slurry into a sedimented phase and a dispersed phase.

In the dispersed phase, the upper portion which was separated from the sedimented phase by not less than 5 mm was sucked with a pump and recovered as the dispersed phase. The solid content concentration of the recovered dispersed phase (slurry) was from 4.7 to 6.7 mass % as shown in Table 1 below.

Figure 2:
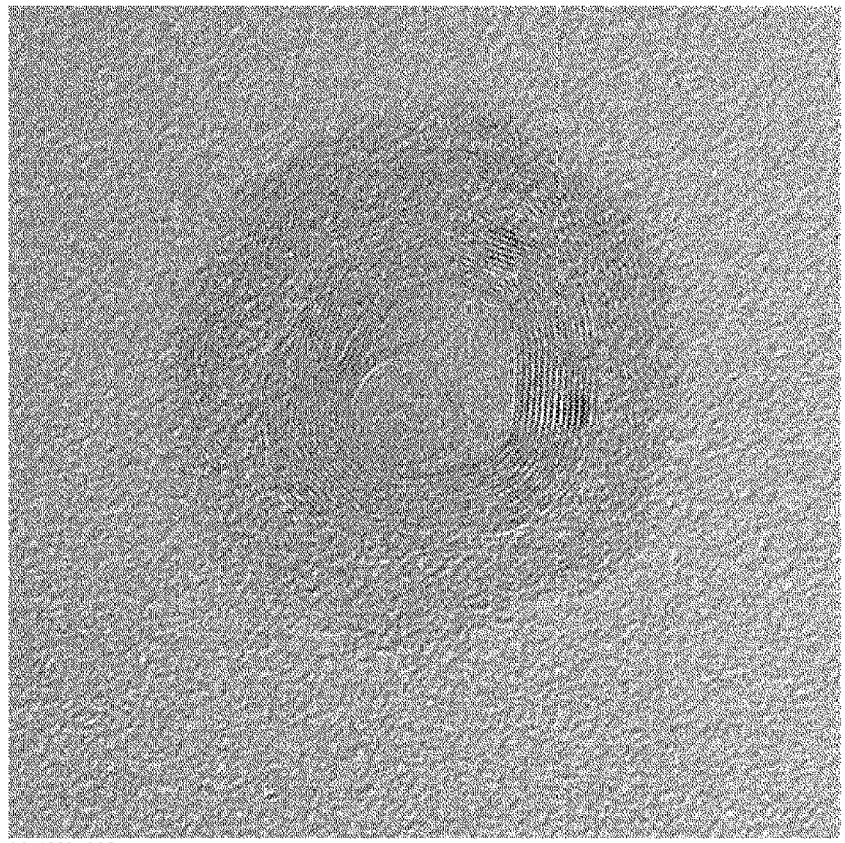
FIG. 2 is a TEM image of a dispersed phase recovered after centrifugation, taken in the field of view different from that of FIG. 1.

FIGS. 1 and 2 are TEM images of a dispersed phase recovered after centrifugation in Example 1. The fields of views of FIGS. 1 and 2 are different from each other. As shown in FIGS. 1 and 2, the presence of a halloysite nanotube was observed in the recovered dispersed phase. More specifically, a long halloysite nanotube can be seen in FIG. 1, and the side surface (cross section) of the halloysite nanotube can be seen in FIG. 2. Although not shown in the TEM images, halloysite with a shape other than a tubular shape (for example, a sheet-like shape) was also observed.

<<Spray-Drying>>

The recovered dispersed phase (slurry) was spray-dried by using a spray-dryer to obtain powder (halloysite powder).

The spray-dryer L-8i available from Ohkawara kakohki Co., LTD. was used as the spray-dryer. The slurry was dispensed to the spray-dryer with a pump at a constant volume, and formed into fine particles (sprayed). As the method of contacting hot air and sprayed droplets, the concurrent flow method in which both of hot air and sprayed droplets are directed downward was used.

At that time, for each example, the average particle size of the powder (granules) obtained was adjusted by modifying spray-drying conditions (the solid content concentration of the slurry, the fine particle formation method, the amount of vaporization (kg/h), the inlet temperature (° C.), and the outlet temperature (° C.)) as shown in Table 1 below.

In a case where the rotating disc method was employed as the fine particle formation method, the rotational speed (rpm) of the rotating disc was modified for each example as shown in Table 1 below. In a case where the two-fluid nozzle method or four-fluid nozzle method (twin-jet nozzle method) was employed as the fine particle formation method, the spray air pressure (MPa) was modified for each example as shown in Table 1 below.

Table 1 below also shows the spray-drying conditions of Example 9 described later.

showed no change before and after firing, showing the diffraction pattern of halloysite.

<Preparation of Halloysite Powder of Examples 9: Spray-Drying>

Halloysite available from sigma-Aldrich Co. LLC (halloysite nanotube, product number: 685445), water, and an anionic polymeric surfactant (available from Kao Corporation, POIZ 520) were charged into a high-speed mixer (available from NISSEI Corporation., Ultra Homomixer UHM-20), then the mixture was subjected to a treatment for 10 minutes at 10,000 rpm, and thereby a slurry (solid content concentration: 6.7 mass %) was obtained. The content of the anionic polymeric surfactant relative to the total solid content of the slurry was 1.5 mass %.

Next, the halloysite powder of Example 9 was obtained by spray-drying the obtained slurry under the condition shown in Table 1 above.

<Preparation of Halloysite Powder of Example 10: Media Fluidized Drying>

The slurry obtained in the same manner as Examples 1 to 8 (the solid content concentration was 4.9 mass %) was media-fluidized-dried using the slurry dryer SFD-0.5 available from OKAWARA MFG. CO., LTD. (blowing temperature: 250° C., exhaust temperature: 120° C., media alumina ball: φ3.0, slurry supply rate: 33.1 kg/hr), and thereby the halloysite powder of Example 10 was obtained.

<Halloysite Powder of Comparative Example 1>

Halloysite available from Sigma-Aldrich Co. LLC. (halloysite nanotube, product number: 685445) was used as it is as the halloysite powder of Comparative Example 1.

<Evaluation of Halloysite Powder>

<<SEM>>

SEM images of the halloysite powders of Examples 1 to 10 were taken.

TABLE 1

| | | Spray-drying conditions | | | | | |
|---|---|---|---|---|---|---|---|
| | Fine particle formation method | Solid content concentration of slurry [mass %] | Spray air pressure [MPa] | Disc rotational speed [rpm] | Amount of vaporization [kg/h] | Inlet temp. [° C.] | Outlet temp. [° C.] |
| Example 1 | Four-fluid nozzle | 5.8 | 0.2 | — | 1.22 | 180 | 82 |
| Example 2 | method | 4.7 | 0.2 | — | 2.76 | 250 | 94 |
| Example 3 | | 4.7 | 0.1 | — | 2.86 | 250 | 97 |
| Example 4 | Two-fluid nozzle method | 5.7 | 0.2 | — | 1.26 | 180 | 96 |
| Example 5 | Rotating disc | 5.8 | — | 35,000 | 1.32 | 180 | 99 |
| Example 6 | method | 5.8 | — | 20,000 | 1.32 | 180 | 101 |
| Example 7 | | 6.7 | — | 17,000 | 1.95 | 170 | 88 |
| Example 8 | | 5.8 | — | 8,000 | 1.22 | 180 | 101 |
| Example 9 | | 6.7 | — | 25,000 | 2.01 | 150 | 66 |

<<Firing>>

The halloysite powder of Example 1 was fired after spray-drying.

Specifically, the powder after spray-drying was heated with an electric furnace utilizing Siliconit heating elements by increasing the temperature of the electric furnace from room temperature to 400° C. over 1 hour and 10 minutes, the temperature was maintained at 400° C. for 1 hour, and then the powder was cooled in the furnace. At that time, to promote burning off of the surfactant, ventilation was performed while a certain amount of air was supplied into the furnace.

Removal of the surfactant from the powder after firing was confirmed by TG-DTA (thermogravimetry-differential thermal analysis). The result of the XRD measurement FIGS. 3 to 5 are SEM images showing the halloysite powder of Example 1, FIG. 4 is an enlarged image of FIG. 3, and FIG. 5 is an enlarged image of FIG. 4.

FIGS. 6 and 7 are SEM images showing the cross section of a granule included in the halloysite powder of Example 1, and FIG. 7 is an enlarged image of FIG. 6.

From the SEM images of FIGS. 3 to 7, it was confirmed that: the halloysite powder of Example 1 included a granule that was an aggregate of halloysite including halloysite nanotubes; tube holes of halloysite nanotubes (first pores) were present on the surface of the granule; and pores having a larger diameter than that of the tube hole of the halloysite nanotube (second pores) were present in the cross section of the granule.

The similar features were found in the SEM images (not illustrated) of the halloysite powders of Examples 2 to 9.

FIGS. 20 and 21 are SEM images showing the halloysite powder of Example 10, and FIG. 21 is an enlarged image of FIG. 20.

From the SEM images of FIGS. 20 and 21, it was confirmed that: the halloysite powder of Example 10 included a granule that was an aggregate of halloysite including halloysite nanotubes; and tube holes of halloysite nanotubes (first pores) were present on the surface of the granule.

Further, it was confirmed that, in the halloysite powder of Example 10, pores having a larger diameter than that of the tube hole of the halloysite nanotube (second pores) were also present in the cross section (not illustrated) of the granule of the halloysite powder.

<<Pore Distribution Measurement>>

The nitrogen adsorption-desorption isotherms of the halloysite powders of Examples 1 to 10 and Comparative Example 1 were obtained. The measurement conditions are as described above.

FIGS. 8 to 18 are graphs showing the differential pore distributions of halloysite powders of Examples 1 to 10 and Comparative Example 1 determined from the nitrogen adsorption isotherms by the BJH method. In the graphs, the horizontal axis represents the pore size (nm), and the vertical axis represents the differential pore volume (dVp/dlogDp) ($cm^3/g$).

In the graphs of FIGS. 8 to 15, and 17 (Examples 1 to 8, and 10), two or three pore size peaks were observed in the range from 10 to 50 nm (10 to 40 nm).

In the graph of FIG. 16 (Example 9), three pore size peaks were observed in the range from 10 to 50 nm, and one pore size was also observed in the range greater than 50 nm. For two peaks in the range greater than 40 nm, probably, the second pores were formed in the granule due to impurities such as quartz, and those peaks derived from the second pores appeared.

In the graph of FIG. 18 (Comparative Example 1), a peak (supposedly, corresponding to the tube hole of the halloysite nanotube) was observed in the range from 10 to 20 nm, but the pore size peak was not observed in the range greater than 20 nm.

In the graph of FIG. 18 (Comparative Example 1), a large number of pore sizes greater than 100 nm were observed. This is probably because voids formed between commercially available halloysite nanotube particles (with a small size) were detected.

Along with the pore distribution measurement, the BJH total pore area, the BJH total pore volume, the BET specific surface area, the total pore volume for calculation, and the average pore size were determined for the halloysite powders of Examples 1 to 10 and Comparative Example 1. The results are shown in Table 2 below.

The halloysite powders of Examples 2 to 10 were fired under the same conditions as Example 1, and then the pore distribution measurement was performed in the same manner as described above. It was confirmed that the pore size peaks similar to the pore size peaks before firing were maintained for all of the halloysite powders. The case where the peak shape became sharper was also seen.

<<Pulverizing of Halloysite Powder>>

As a representative example among the halloysite powders of Examples 1 to 10, the halloysite powder of Example 6 was pulverized by using an Ishikawa-type stirring grinder (available from Ishikawa Kojo Co., Ltd., model: AGB model, rotation type: FR type, mortar type: agate). The cumulative time of the pulverizing was 240 minutes. After pulverizing, pore distribution measurement was performed in the same manner as described above. The measurement result showed that the pore size peak corresponding to the second pore, which was present before pulverizing, disappeared after pulverizing (not illustrated).

The above result showed that, in the granule before pulverizing, halloysite including halloysite nanotubes aggregated and constituted the granule, and the second pore was formed between the aggregated halloysite. It is conceived that the aggregated halloysite was disintegrated by pulverizing, so that the second pore disappeared.

<<Average Particle Size>>

The average particle sizes of the halloysite powders of Examples 1 to 10 and Comparative Example 1 were measured. The results are shown in Table 2 below. The case where measurement was not performed was denoted as "-" in Table 2 below.

<<Bulk Density and Angle of Repose>>

The initial bulk densities, tap bulk densities, and angles of repose of the halloysite powders of Examples 1 to 10 and Comparative Example 1 were measured. The results are shown in Table 2 below. The case where measurement was not performed was denoted as "-" in Table 2 below.

<<Purity and Quartz Content>>

XRD measurement was performed on the halloysite powders of Examples 1 to 10 and Comparative Example 1. As a representative example, the XRD patterns of halloysite powders of Example 1 and Comparative Example 1 are shown in FIG. 19. In the XRD pattern of Example 9 (not illustrated) and the XRD pattern of Comparative Example 1, the peaks of gibbsite and quartz appeared. In contrast, in the XRD patterns of Examples 1 to 8, and 10 (examples other than Example 1 are not illustrated), the peak of gibbsite was not observed, and the peak of quartz was very small. In view of the above, it is concluded that the halloysite powders of Examples 1 to 8, and 10 include few impurities such as gibbsite and quartz, and have a high purity.

Then, the quartz contents of the halloysite powders of Examples 1 to 10 and Comparative Example 1 were actually measured. The measurement results are shown in Table 2 below.

<<Humidity-Control Property>>

The humidity-control properties of the halloysite powders of Examples 1 to 10 and Comparative Example 1 were evaluated.

Approximately 1 g of a powder sample (halloysite powder) was placed in a weighing bottle made of borosilicate glass (diameter: 30 mm, height: 30 mm), vacuum drying was performed at 120° C. for 24 hours at −0.1 MPa (G), after which the dry mass of the powder sample (a) was determined. The weighing bottle containing the powder sample was placed in a thermo-hygrostat, and the conditions for humidity control were set as follows: temperature: 25° C. (fixed), relative humidity (RH): 80% or 50%. A mass change ratio (c) (mass %) was determined from the equilibrium mass (b) and the dry mass (a) at RH 80% or 50% based on the following equation.

$$(c)=((b)-(a))/(a)\times100$$

For the specific operation, the mass change ratio (c8-1) of a powder sample that has been placed for 24 hours in a thermo-hygrostat controlled at RH 80% was first determined, after which the relative humidity was changed to 50%, and the mass change ratio (c5-1) of the powder sample after 24 hours was determined. Then, the difference of mass change ratio D1 ((c8-1)−(c5-1)) was calculated.

Subsequently, the relative humidity was changed to 80%, and the mass change ratio (c8-2) after 24 hours was determined. Then, the difference of mass change ratio D2 ((c8-2)−(c5-1)) was calculated.

Subsequently, the relative humidity was changed to 50%, and the mass change ratio (c5-2) after 24 hours was determined. Then, the difference of mass change ratio D3 ((c8-2)−(c5-2)) was calculated.

Subsequently, the relative humidity was changed to 80%, and the mass change ratio (c8-3) after 24 hours was determined. Then, the difference of mass change ratio D4 ((c8-3)−(c5-2)) was calculated.

Subsequently, the relative humidity was changed to 50%, and the mass change ratio (c5-3) after 24 hours was determined. Then, the difference of mass change ratio D5 ((c8-3)−(c5-3)) was calculated.

Subsequently, the relative humidity was changed to 80%, and the mass change ratio (c8-4) after 24 hours was determined. Then, the difference of mass change ratio D6 ((c8-4)−(c5-3)) was calculated.

Subsequently, the relative humidity was changed to 50%, and the mass change ratio (c5-4) after 24 hours was determined. Then, the difference of mass change ratio D7 ((c8-4)−(c5-4)) was calculated.

The average value (mass %) of the differences of mass change ratio D1 to D7 is shown as the humidity-control property in Table 2 below. A larger value can be rated as having a better humidity-control property.

The lid of the weighing bottle was open in the thermo-hygrostat, but when measuring the mass, the weighing bottle was closed to reduce effect of the atmospheric environment.

The invention claimed is:

1. A halloysite powder comprising a granule that is an aggregate of halloysite including a halloysite nanotube,
   wherein the granule includes a first pore derived from a tube hole of the halloysite nanotube, and a second pore different from the first pore,
   wherein a differential pore distribution determined from a nitrogen adsorption isotherm by the BJH method exhibits two or more pore size peaks of 10 nm or more, and
   wherein an average particle size of the granule is from 0.5 to 200 μm.

2. The halloysite powder according to claim 1, wherein the differential pore distribution exhibits a pore size peak in a range from 10 nm to 20 nm and a pore size peak of greater than 20 nm.

3. The halloysite powder according to claim 2, wherein an initial bulk density is not less than 0.40 g/cm$^3$.

4. The halloysite powder according to claim 2, wherein a tap bulk density is not less than 0.70 g/cm$^3$.

5. The halloysite powder according to claim 1, wherein an initial bulk density is not less than 0.40 g/cm$^3$.

6. The halloysite powder according to claim 5, wherein a tap bulk density is not less than 0.70 g/cm$^3$.

7. The halloysite powder according to claim 1, wherein a tap bulk density is not less than 0.70 g/cm$^3$.

8. The halloysite powder according to claim 1, wherein an angle of repose is not greater than 50°.

9. The halloysite powder according to claim 1, wherein a BET specific surface area is from 30 to 200 m$^2$/g.

TABLE 2

|  | BJH total pore area [m$^2$/g] | BJH total pore volume [cm$^3$/g] | BET specific surface area [m$^2$/g] | Total pore volume for calculation [cm$^3$/g] | Average pore size [nm] | Average particle size [μm] | Initial bulk density [g/cm$^3$] | Tap bulk density [g/cm$^3$] | Angle of repose [°] | Quartz content [mass %] | Humidity-control property [mass %] |
|---|---|---|---|---|---|---|---|---|---|---|---|
| Example 1 | 89.2 | 0.31 | 76.3 | 0.30 | 16.0 | 3.0 | 0.47 | 0.79 | 43 | 0.31 | 5.6 |
| Example 2 | 84.1 | 0.26 | 73.8 | 0.26 | 13.9 | 3.1 | 0.46 | 0.77 | 44 | 0.33 | 5.9 |
| Example 3 | 91.4 | 0.28 | 88.5 | 0.28 | 12.5 | 5.1 | 0.58 | 0.95 | 41 | 0.32 | 6.0 |
| Example 4 | 92.8 | 0.29 | 85.9 | 0.28 | 13.2 | 6.7 | 0.51 | 0.83 | 42 | 0.36 | 5.8 |
| Example 5 | 89.6 | 0.26 | 76.7 | 0.25 | 13.3 | 10.0 | 0.63 | 0.97 | 43 | 0.33 | 5.9 |
| Example 6 | 85.2 | 0.25 | 74.1 | 0.24 | 13.0 | 17.6 | 0.87 | 1.02 | 33 | 0.31 | 5.7 |
| Example 7 | 88.3 | 0.28 | 74.2 | 0.28 | 14.9 | 26.4 | 0.77 | 0.98 | 29 | 0.36 | 5.9 |
| Example 8 | 89.7 | 0.24 | 85.3 | 0.24 | 11.1 | 36.0 | 0.91 | 1.00 | 23 | 0.37 | 5.8 |
| Example 9 | 62.4 | 0.21 | 63.9 | 0.20 | 12.2 | 12.0 | 0.59 | 0.93 | 42 | 1.17 | 3.7 |
| Example 10 | 73.9 | 0.21 | 71.8 | 0.21 | 11.6 | 145 | 0.74 | 0.99 | 38 | 0.34 | 5.0 |
| Comparative example 1 | 57.5 | 0.18 | 65.7 | 0.18 | 10.4 | — | 0.42 | 0.72 | 52 | 1.23 | 2.5 |

As shown in Table 2 above, it was found that the halloysite powders of Examples 1 to 10 had better humidity-control properties than the halloysite powder of Comparative Example 1. This is probably because the halloysite powders of Examples 1 to 10 include not only the first pore derived from a tube hole but also the second pore.

Comparing the humidity-control properties of Examples 1 to 10, the humidity-control properties of Examples 1 to 8, and 10 are better than the humidity-control property of Example 9. It is presumed that, as shown in Table 2 above, the quartz contents of the halloysite powders of Examples 1 to 8, and 10 are smaller than that of the halloysite powder of Example 9, and therefore the amounts of the first pore and second pore per unit mass of the halloysite powders of Examples 1 to 8, and 10 are larger than those of Example 9.

10. The halloysite powder according to claim 1, wherein an average pore size is not less than 11.0 nm.

11. The halloysite powder according to claim 1, wherein a total pore area is not less than 59.0 m$^2$/g.

12. The halloysite powder according to claim 1, wherein a total pore volume is not less than 0.20 cm$^3$/g.

13. The halloysite powder according to claim 1, wherein a quartz content is not greater than 1.00 mass %.

14. A method of producing the halloysite powder described in claim 1, comprising:
   a step of preparing a slurry of halloysite including a halloysite nanotube; and
   a step of preparing powder from the slurry,
   wherein the solid content concentration of the slurry is 30 mass % or less.

15. The method of producing a halloysite powder according to claim 14, further comprising a step of firing the prepared powder.

16. The method of producing a halloysite powder according to claim 15, wherein the step of preparing powder from the slurry is a step of spray-drying the slurry.

17. The method of producing a halloysite powder according to claim 15, wherein the step of preparing powder from the slurry is a step of media-fluidized-drying the slurry.

18. The method of producing a halloysite powder according to claim 14, wherein the step of preparing powder from the slurry is a step of spray-drying the slurry.

19. The method of producing a halloysite powder according to claim 14, wherein the step of preparing powder from the slurry is a step of media-fluidized-drying the slurry.

* * * * *